United States Patent Office 2,745,857
Patented May 15, 1956

2,745,857

GLYCOLIC ACID ETHERS OF POLYOXYPROPYLENE COMPOUNDS AND METHOD OF PREPARATION

Edgar C. Britton and Peter S. Petrie, Midland, Mich., assignors to The Dow Chemical Company, Midland, Mich., a corporation of Delaware No Drawing. Application February 23, 1952,
Serial No. 273,156

7 Claims. (Cl. 260—429)

This invention concerns certain new glycolic acid ethers of polyoxypropylene compounds having a relatively high molecular weight. It relates more particularly to the glycolic acid ethers of polypropylene glycols and glycolic acid ethers of monoethers of polypropylene glycols. The invention also concerns a method of making such glycolic acid ethers and relates to inorganic salts of the same.

The new glycolic acid ethers are prepared from chloro-acetic acid or its anhydride and a linear polyoxypropylene compound containing an hydroxyl group, i. e. a polypropylene glycol or a monoether of a polypropylene glycol. They all contain the carboxymethyl group (—$CH_2$.COOH) attached to the oxygen atom of an hydroxyl compound. The new compositions are soluble in aromatic hydrocarbons such as benzene, toluene, xylene, ethylbenzene, or isopropylbenzene. They possess bactericidal and fungicidal properties and are useful as the active ingredient in the preparation of bactericidal and fungicidal compositions. They are useful as intermediates in the preparation of other chemical compositions, e. g. the preparation of esters by reaction of the carboxylic acid group or groups with an alcohol to form a corresponding ester. The new glycolic acid ethers may be reacted with the oxides, hydroxides, or salts of metals, e. g. zinc oxide, copper hydroxide, sodium hydroxide, potassium carbonate, or sodium bicarbonate, to form inorganic salts of the ether acids. The alkali metal salts, e. g. the sodium salts, of the glycolic acid ethers are soluble in water and are useful as wetting agents, emulsifiers, or dispersants. Other metal salts of the glycolic acid ethers, e. g. the copper or zinc salts, are soluble in oils. They also possess bactericidal and fungicidal properties and are useful in the preparation of bactericidal and fungicidal compositions.

The new glycolic acid ethers are obtained by the reaction of an alkali metal derivative of a linear polypropylene glycol or a monoether of a polypropylene glycol and a salt of chloroacetic acid, e. g. sodium chloroacetate, to form the corresponding glycolic acid ether of the polyoxypropylene compound.

The propylene glycols or mono-ethers of polypropylene glycols to be employed as starting materials in the preparation of the glycolic acid ethers are known compounds and may be prepared by reaction or condensation of 1,2-propylene oxide in the presence of a small amount, e. g. from one to ten per cent by weight, of an alcohol, a phenol, a glycol, or water, as starting material and a strongly alkaline catalyst such as sodium hydroxide or potassium hydroxide. The polypropylene glycols employed in the reaction preferably contain only oxy-1,2-propylene groups in the polyoxyalkylene chain and have an average molecular weight of at least 900 suitably a molecular weight of from 940 to 2400. The monoethers of polypropylene glycols employed in preparing the compositions of the invention are the alkyl, aryl and aralkyl mono-ethers obtained by the condensation of 1,2-propylene oxide in the presence of a small amount of an aliphatic alcohol having from 1 to 16 carbon atoms, an aralkyl alcohol, e. g. benzyl alcohol, or a phenol such as phenol itself, ortho-, meta-, and para-cresol, 4-tertiary-butylphenol, ortho-phenylphenol, beta-napthol, or 2-ethyl-4-tertiary butylphenol, and a strongly alkaline catalyst. The polypropylene glycol monoethers employed in the reaction are suitably polypropylene monoalkyl ethers containing from 1 to 16 carbon atoms in the alkyl radical, or a phenyl, or a tolyl polypropylene glycol monoether, or polypropylene glycol monoaralkyl ethers such as benzyl polypropylene glycol monoether, or beta-phenylethyl polypropylene glycol monoether.

The polypropylene glycol monoethers which are employed as reactants have a molecular weight of at least 400, preferably an average molecular weight of from 450 to 1450.

The polypropylene glycols, or monoethers of polypropylene glycols, are usually obtained as complex mixtures of linear diols, or monoethers of diols, in which the polyoxy-1,2-propylene chains are of different lengths, i. e. they are mixtures of polypropylene glycols, or mixtures of monoethers of polypropylene glycols, having different molecular weights. Accordingly, the new compositions are complex mixtures of di-carboxymethyl ethers of polypropylene glycols, or mixtures of mono-carboxymethyl ethers of monoethers of polypropylene glycols, depending upon whether the new glycolic acid ethers are derived from chloroacetic acid and a polypropylene glycol, or from chloroacetic acid and an alkyl, aryl, or aralkyl monoether of a polypropylene glycol.

The new compositions with which the invention is concerned are the dicarboxymethyl ethers of polypropylene glycols, which products have an average molecular weight of from 1000 to 2500, and the mono-carboxymethyl ethers of alkyl, aryl, or aralkyl monoethers of polyproplyene glycols, which products have an average molecular weight of from 500 to 1500, and the soluble metal salts of such glycolic acid ethers, particularly the alkali metal salts thereof. The latter compounds are soluble in water and are useful as wetting and emulsifying agents.

The new glycolic acid ethers are prepared by reacting an alkali metal derivative of a polypropylene glycol, or a monoether of a polypropylene glycol, preferably the sodium derivative of such compounds, and a salt of chloroacetic acid, suitably sodium chloroacetate, in anhydrous or substantially anhydrous form and separating the glycolic acid ether from the crude reaction product. The reaction is preferably carried out in the presence of a water-immiscible organic liquid such as benzene, toluene, or monochlorobenzene, and in the absence or substantial absence of water. The reaction may be carried out employing an excess of the polypropylene glycol, or monoether of a polypropylene glycol as solvent or reaction medium, in which case no other liquid medium need be used.

In practice, a monoether of a polypropylene glycol, or a polypropylene glycol, of suitable molecular weight as hereinbefore mentioned, is mixed with an inert water-immiscible organic solvent, e. g., toluene, and is reacted with metallic sodium in amount chemically equivalent to the hydroxyl groups in the starting material, to form the corresponding sodium derivative thereof. The mixture is stirred and a salt of chloroacetic acid, preferably sodium chloroacetate, in anhydrous or substantially anhydrous form is added thereto in amount corresponding to a chemically equivalent proportion of the sodium chloroacetate per mole of the sodium derivative of the polypropylene glycol, or the sodium derivative of the monoether of polypropylene glycol employed. The sodium chloroacetate is conveniently added to the reaction as a slurry of the salt in an inert organic liquid, e. g., toluene. The reaction is usually carried out with stirring at temperatures between 80° and 150° C. and at atmospheric pressure. The reactants may be sealed in an autoclave, or a pressure resistant vessel, and heated at superatmospheric pressure, if desired. Upon completion of the reaction, the crude product is filtered to separate insoluble substances, e. g., sodium chloride. The filtrate is heated, preferably with gradual reduction of pressure on the system to distill the solvent from the crude product. The latter is acidified by treating the same with an aqueous solution of an acid such as dilute sulfuric acid, or hydrochloric acid, and is mixed with a water-immiscible solvent, e. g. toluene or benzene, to cause separation of the aqueous and the organic layers. The aqueous and organic layers are separated. The organic layer is heated, suitably with gradual reduction of pressure on the system, to distill the solvent from the crude product. The crude product is diluted with an aqueous solution of a lower aliphatic alcohol such as methanol, ethanol, or isopropanol, which aqueous alcohol solution has a concentration of approximately 50 percent by volume and is in amount such as to form a mobile or readily flowable solution. The solution is treated with a strongly basic anion exchange resin containing quaternary ammonium hydroxide groups to separate the glycolic acid ether from the unreacted polypropylene glycol or monoether of polypropylene glycol. The glycolic acid ether is adsorbed on the strongly basic anion exchange resin in its hydroxide form while the unreacted polypropylene glycol remains in the solution. The glycolic acid ether may be adsorbed on the resin by stirring the granular resin with the aqueous solution, or by passing the solution through a bed of the resin. The adsorbed glycolic acid ether may be displaced from the anion exchange resin by treating the same with an aqueous solution of an acid, e. g. an aqueous 10 weight per cent solution of hydrochloric acid. The glycolic acid ether product is preferably displaced from the resin by treating the latter with an amount of the mineral acid, e. g., hydrochloric acid, chemically equivalent to the glycolic acid ether adsorbed. The glycolic acid ether usually separates as an oily liquid and is suitably recovered by dissolving the same in a water immiscible organic solvent such as benzene, toluene, ethylbenzene, or monochlorobenzene, separating the aqueous and organic layers and heating the latter preferably with gradual reduction of pressure on the system to remove the solvent together with other volatile ingredients from the glycolic acid ether product. The product is usually obtained as a liquid residue having an amber to brown color.

For some purposes, the glycolic acid ethers need not be separated from the crude reaction product in purified, or free form. For instance, the crude reaction product comprising the sodium salt of the glycolic acid ethers, together with unreacted polypropylene glycol, or monoether of polypropylene glycol, may be filtered to separate insoluble substances, e. g., sodium chloride. The filtrate is heated, suitably with gradual reduction of pressure on the system to distill the solvent from the crude product. The residue or crude product consisting principally of the crude sodium salts of the glycolic acid ethers together with unreacted polypropylene glycol or monoether of polypropylene glycol is useful as an emulsifying agent.

The following examples illustrate ways in which the principle of the invention has been applied but are not to be construed as limiting the invention.

*Example 1*

A charge of 3000 grams of polypropylene glycol monooctyl ether having an average molecular weight of 500, was gradually added over a period of one hour to a stirred mixture of 3000 cc. of toluene and 138 grams of metallic sodium maintained at a temperature of 110° C. The mixture was then stirred and maintained at a temperature of 110° C. for a further period of seven hours.

A mixture of 516 grams of chloroacetic anhydride, and 3000 cc. of toluene as solvent was stirred and heated on a steam bath. 324 grams of sodium carbonate was gradually added thereto over a period of two hours. A slurry of solid sodium chloroacetate and toluene was obtained.

The above preparations were mixed together. The mixture was stirred and maintained at a temperature of 110° C. over a reaction period of 8 hours. The mixture was then cooled and filtered. The filtrate was heated, with gradual reduction of pressure on the system, to remove the toluene therefrom. Distillation was continued to a point at which the liquid in the still was being heated at a temperature of 150° C. at 8 millimeters absolute pressure. There was obtained 3370 grams of liquid residue. A charge of 500 grams of the liquid residue was mixed with approximately 1100 cc. of an aqueous 8.4 weight per cent solution of hydrochloric acid and the mixture stirred for a period of one hour. Thereafter 500 cc. of benzene was added to the mixture and the aqueous and the organic layers were separated. The organic layer was heated, with gradual reduction of pressure on the system, to remove the benzene. Distillation was continued to a point at which the liquid in the still was being heated at a temperature of 100° C. at 10 millimeters absolute pressure. There was obtained 451 grams of liquid residue. The liquid residue was mixed with 1000 cc. of ethyl alcohol and 200 cc. of water. The solution was stirred with 750 grams of a granular anion exchange resin containing quaternary ammonium hydroxide groups over a period of one hour to adsorb the glycolic acid ether on the resin. The anion exchange resin was in the form of rounded beads of a size such as to pass through a 20 mesh per inch Tyler screen and be retained on a 50 mesh screen. The anion exchange resin had a capacity equivalent to 1.20 milliequivalents of HCl per cubic centimeter of a bed of the resin. The slurry of liquid and resin beads was filtered and the resin was washed with ethanol. The filtrate was heated to distill the ethanol and water from the remaining liquid. Distillation was continued with gradual reduction of pressure on the system to a point at which the liquid in the still was being heated at a temperature of 150° C. at 5 millimeters absolute pressure. There was obtained 170 grams of unreacted polypropylene glycol mono-octyl ether as residue. The anion exchange resin beads, containing the adsorbed glycolic acid product, were mixed with approximately 1650 cc. of an aqueous 9 weight per cent solution of hydrochloric acid and the mixture was stirred for one hour. Thereafter, 500 cc. of benzene was added to the mixture. The mixture was filtered and the resin was washed with benzene. The aqueous and organic layers were separated. The organic layer was heated, with gradual reduction of pressure on the system, to separate the benzene therefrom. Distillation was continued to a point at which the liquid in the still was being heated at a temperature of 150° C. at 5 millimeters absolute pressure. There was obtained 157 grams of carboxymethyl polypropylene glycol mono-octyl ether, as a pale yellow liquid having an acid value corresponding to an average molecular weight of 530.

*Example 2*

By procedure similar to that described in Example 1, polypropylene glycol monobutyl ether having an average molecular weight of 900 was reacted with chloroacetic acid to form the corresponding carboxymethyl polypropylene glycol monobutyl ether and the product was separated from the crude reaction mixture. The carboxymethyl polypropylene glycol monobutyl ether product was an amber liquid having an acid value corresponding to an average molecular weight of 870, a specific gravity of 1.019 at 25° C. compared to water at 4° C., and an index of refraction of $n_D^{25}=1.4487$.

*Example 3*

A portion of the carboxymethyl polypropylene glycol monobutyl ether product of Example 2 was neutralized with an aqueous 1 normal solution of sodium hydroxide to form an aqueous solution containing the sodium salt of the carboxymethyl ether. A charge of the solution, in amount corresponding to 2.18 grams of the sodium salt of the carboxymethyl polypropylene glycol monobutyl ether, was diluted with water to a volume of 50 cc. The solution was mixed with 10 cc. of ethylene dibromide. The mixture was shaken and passed twice through a laboratory homogenizer. The resulting emulsion was allowed to stand over a period of 16 hours. No separation of the ethylene dibromide from the aqueous phase occurred.

*Example 4*

A charge of 2000 grams of polypropylene glycol mononyl ether having an average molecular weight of 1000 was gradually added with stirring to a mixture of 46 grams of metallic sodium and 1000 cc. of toluene at a temperature of 110° C. The mixture was stirred and heated at a temperature of 110° C. over a period of 8 hours.

To a solution of 172 grams of chloroacetic anhydride and 1000 cc. of toluene there was gradually added with stirring 100 grams of anhydrous sodium carbonate. The mixture was stirred and heated on a steam bath over a period of two hours. The above preparations were mixed and the mixture stirred and heated at a reaction temperature of 110° C. over a period of 11 hours. The mixture was filtered to separate the sodium chloride formed in the reaction. The filtrate was heated with gradual reduction of pressure on the system to distill toluene therefrom. Distillation was continued to a point at which the residue in the still was being heated at a temperature of 125° C. at 5 millimeters absolute pressure. There was obtained 2258 grams of residue. The conversion was 75 per cent complete. The crude reaction product comprising the sodium salt of carboxymethyl polypropylene glycol mononyl ether formed a stable emulsion of ethylene dibromide and water when tested as described in Example 3.

*Example 5*

Polypropylene glycol monophenyl ether having an average molecular weight of 900 was reacted with chloroacetic acid by procedure similar to that described in Example 1. The carboxymethyl polypropylene glycol monophenyl ether was obtained as a brown liquid having an acid value corresponding to an average molecular weight of 800, a specific gravity of 0.987 at 25° C. compared to that of water at 4° C., and an index of refraction $n_D^{25}=1.4610$.

*Example 6*

A charge of 2000 grams of a polypropylene glycol having an average molecular weight of 2000, was gradually added to a mixture of 3 liters of toluene and 46 grams of metallic sodium over a period of one hour while stirring and maintaining the mixture at a temperature of 110° C. After completing the addition, the mixture was stirred and maintained at 110° C. for 9 hours.

A solution of 172 grams of chloroacetic anhydride and 2 liters of toluene was heated on a steam bath. The solution was stirred and 106 grams of sodium carbonate was gradually added thereto over a period of 2 hours. The above preparations were mixed together and the mixture stirred and maintained at a reaction temperature of 110° C. over a period of 10 hours. The crude reaction product was heated to distill toluene therefrom. Distillation was continued in vacuum to a point at which the residue in the still was being heated at a temperature of 80° C. at 25 millimeters absolute pressure. There was obtained 2310 grams of a viscous liquid as residue. A charge of 670 grams of the residue was mixed with 3100 cc. of an aqueous 3 weight per cent solution of hydrochloric acid and 600 cc. of benzene. The aqueous and organic layers were separated. The organic layer was heated, with gradual reduction of pressure on the system, to separate the benzene. Distillation was continued to a point at which the liquid in the still was being heated at a temperature of 150° C. at 3 millimeters absolute pressure. There was obtained 501 grams of liquid residue. The residue was mixed with 2 liters of an aqueous solution of equal parts by volume of water and ethyl alcohol. The resulting solution was stirred with 400 grams of a granular anion exchange resin containing quaternary ammonium hydroxide groups to adsorb the di-carboxymethyl ether on the resin. The anion exchange resin was in the form of rounded beads of a size such as to pass through a 20 mesh per inch Tyler screen and be retained on a 50 mesh screen. The resin had an anion exchange capacity equivalent to 1.20 milliequivalents of HCl per cubic centimeter of a bed of the resin. The mixture was filtered to separate the resin from the liquid and the resin was washed with an aqueous 50 volume per cent solution of ethanol. The filtrate was heated to distill ethyl alcohol and water therefrom. Distillation was continued with gradual reduction of pressure on the system to a point at which the liquid in the still was being heated at a temperature of 150° C. at 3 millimeters absolute pressure. There was obtained 228 grams of unreacted polypropylene glycol as a yellow liquid. The anion exchange resin containing the adsorbed glycolic acid ether was stirred with approximately 2100 cc. of an aqueous 6 weight per cent solution of hydrochloric acid for a period of 2 hours. Thereafter 500 cc. of benzene were added. The mixture was filtered to separate the resin. The aqueous and organic layers of the filtrate were separated. The organic layer was heated, with gradual reduction of pressure on the system, to separate the benzene. Distillation was continued to a point at which the liquid in the still was being heated at a temperature of 150° C. at 3 millimeters absolute pressure. There was obtained 226 grams of di-carboxymethyl polypropylene glycol ether as a pale yellow liquid having an acid value corresponding to an average molecular weight of 2440. The product had a specific gravity of 1.022 at 25° C. compared to water at 4° C. and an index of refraction of $n_D^{25}=1.4620$.

Other modes of applying the principle of the invention may be employed instead of those explained, change being made as regards the steps or compositions herein employed, provided the compositions or steps stated in any of the following claims or the equivalent of such steps or compositions be employed.

We claim:

1. A composition selected from the group consisting of a mixture of glycolic acid ethers of monoalkyl ethers of polypropylene glycols and salts thereof having the probable formula:

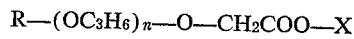

$$R\text{---}(OC_3H_6)_n\text{---}O\text{---}CH_2COO\text{---}X$$

wherein R represents an alkyl radical containing from 1 to 16 carbon atoms, X represents a member of the group consisting of hydrogen and metals and $n$ is a whole number greater than 3, the said glycolic acid ethers of the monoalkyl ethers of the polypropylene glycols having an average molecular weight of from 500 to 1500.

2. A composition comprising the sodium salts of a mixture of glycolic acid ethers of monoalkyl ethers of polypropylene glycols having an alkyl radical containing from 1 to 16 carbon atoms in the alkyl ether group on the polypropylene glycol, the said glycolic acid ethers having an average molecular weight of from 500 to 1500.

3. A composition comprising the zinc salts of a mixture of glycolic acid ethers of monoalkyl ethers of polypropylene glycols having an alkyl radical containing from 1 to 16 carbon atoms in the alkyl ether group on the polypropylene glycol, the said glycolic acid ethers having an average molecular weight of from 500 to 1500.

4. A composition comprising the copper salts of a mixture of glycolic acid ethers of monoalkyl ethers of polypropylene glycols having an alkyl radical containing from 1 to 16 carbon atoms in the alkyl ether group on the polypropylene glycol, the said glycolic acid ethers having an average molecular weight of from 500 to 1500.

5. A composition comprising a mixture of glycolic acid ethers of monoalkyl ethers of polypropylene glycols having an alkyl radical containing from 1 to 16 carbon atoms in the alkyl ether group on the polypropylene glycol, said mixture of glycolic acid ethers of monoalkyl ethers of polypropylene glycols having an average molecular weight of from 500 to 1500.

6. A composition comprising a mixture of glycolic acid ethers of monobutyl ethers of polypropylene glycols, said mixture of glycolic acid ethers having an average molecular weight of from 500 to 1500.

7. A composition comprising a mixture of glycolic acid ethers of mono-octyl ethers of polypropylene glycols, said mixture of glycolic acid ethers having an average molecular weight of from 500 to 1500.

References Cited in the file of this patent

UNITED STATES PATENTS

| | | |
|---|---|---|
| 2,010,154 | Hubacher | Aug. 6, 1935 |
| 2,083,482 | Steindorff et al. | June 8, 1937 |
| 2,183,853 | Haussmann et al. | Dec. 19, 1939 |
| 2,210,874 | Balle et al. | Aug. 13, 1940 |
| 2,280,792 | Bruson | Apr. 28, 1942 |
| 2,531,502 | De Groote et al. | Nov. 28, 1950 |
| 2,653,972 | Ash et al. | Sept. 29, 1953 |

FOREIGN PATENTS

| | | |
|---|---|---|
| 800,079 | France | June 26, 1936 |
| 470,181 | Great Britain | Aug. 3, 1937 |
| 490,416 | Great Britain | Aug. 9, 1938 |
| 228,415 | Switzerland | Jan. 1944 |